BASE FOR TELEPHONE SUBSTATION SET

Filed April 18, 1955

INVENTOR.
Lloyd Bender,
BY
Brown, Jackson, Boettcher & Dienner
Attys.

United States Patent Office 2,868,888

Patented Jan. 13, 1959

2,868,888

BASE FOR TELEPHONE SUBSTATION SET

Lloyd Bender, Galion, Ohio, assignor to North Electric Company, a corporation of Ohio Application April 18, 1955, Serial No. 502,073

6 Claims. (Cl. 179—100)

Figures 1, 2, 3, 4, 5, 6:
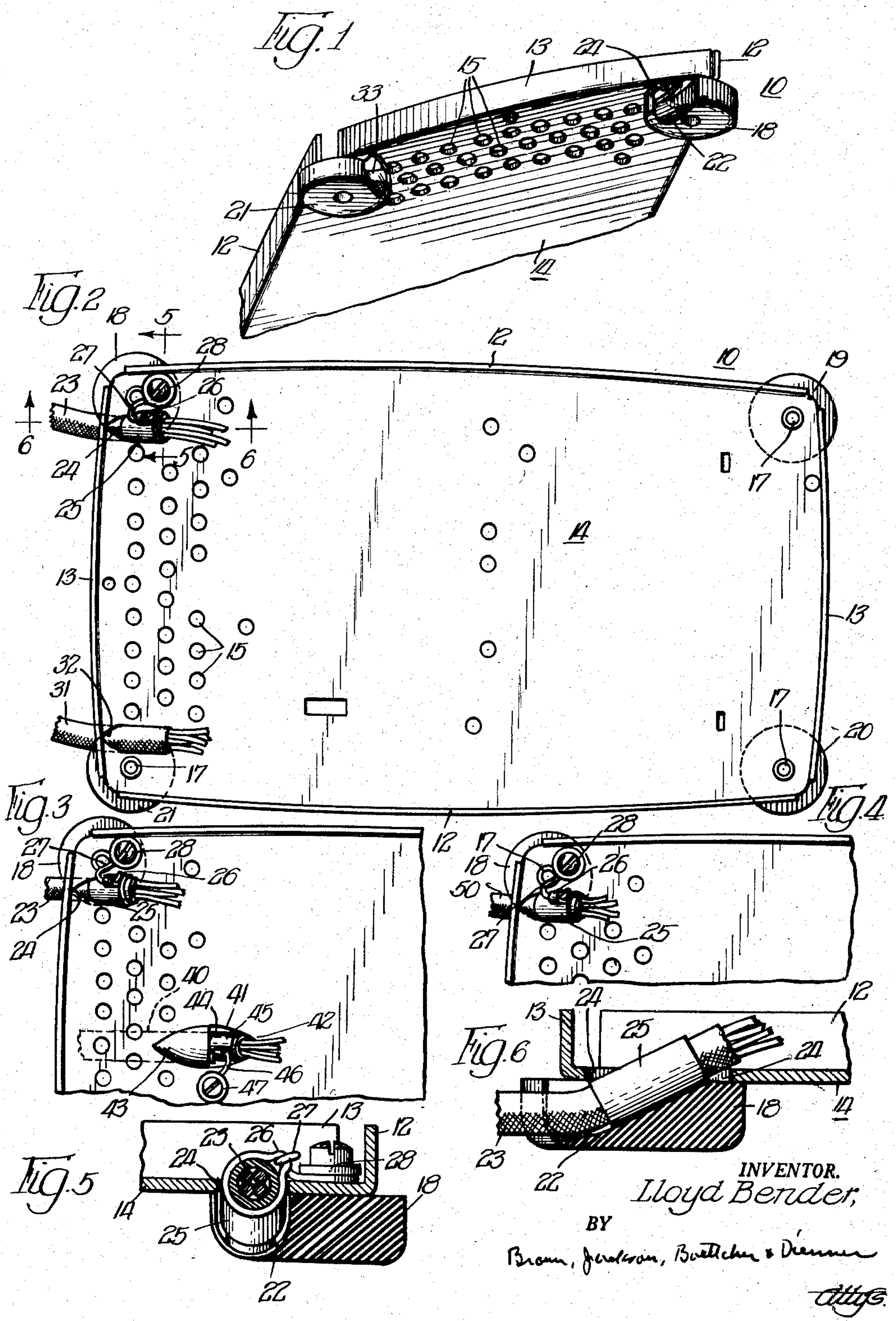

This invention relates generally to telephones, and more particularly to telephone substation sets.

It is necessary to connect the interior dial signalling contacts and voice current operating components of telephone substation sets to outgoing lines. In most conventional telephone substation sets the cords carrying the requisite electrical conductors are introduced into the set through unsightly holes in the lower molding of the substation housing. Such holes not only detract from the appearance of the subset and reduce the strength of the housing, but usually require extra manufacturinng operations, such as grinding and finishing, which add to the cost of producing such substation sets.

As an improvement in the manufacture of telephone substation sets there has been produced a substation set in which the cords are introduced through the base plate. Specifically, apertures or passage means are provided in the base plate and disposed so as to provide for an oblique or relatively flat angle of entrance of the lead-in wires, thus eliminating the undesirable apertures in the lower molding of the substation set. In addition the oblique angle of entrance minimizes an undue strain which might be placed upon conductors introduced at right angles into the substation set. Such a telephone substation has been fully disclosed and claimed in a copending application having Serial No. 461,315, filed on October 11, 1954, by James M. Robinson, Donald H. Lewis and Leonard J. Greshel, and assigned to the present assignee.

The present invention is in the nature of an improvement upon the base plate heretofore described and further leads to an improved appearance of the telephone substation over more conventional models. Specially formed dies necessary for the manufacture of other base plates are rendered unnecessary as a result of the present invention, and an added stability is provided for the lead-in conductors without thte necessity of providing additional clamps and mounting structures therefor.

The introduction of cords through the supporting members of the telephone subset further reduces the unsightly inadvertent resting of the substation set on the conductor carrying cords.

It is an object of the present invention to provide a novel telephone substation characterized by an improved appearance and simplification of assembly and manufacture.

It is a further object of the present invention to provide a novel telephone substation base plate through which lead-in conductors may be introduced and integrally mounted with respect to other components of the base so as to afford additional support to the conductors and prevent undue strain and possible breakage thereof.

The above and further objects, features and advantages of this invention will be recognized by those familiar with the art from the following description of a preferred embodiment thereof, as illustrated in the accompanying drawings, in which like reference numerals identify like elements, and in which:

Figure 1 is perspective view of the underside of the base plate of the present invention, particularly illustrating the passage means in supporting members for the conductors in penetrating the base;

Figures 2–4 are top plan views of the base plate of this invention as viewed from the interior of the subset; and Figures 5 and 6 are amplified cross-sectional views, taken along lines 5—5 and 6—6 respectively of Figure 2 to illustrate more clearly the improved lead-in conductor passageway feature therein.

With reference to Figure 1 which is a perspective view of the under side of one embodiment of the present invention, there is therein shown a base plate 10 comprising a substantially rectangular metal base plate of sheet stock or the like. Base plate 10 comprises a planar platform section 14 having upright flanges 12 and 13 disposed perpendicularly along its periphery with respect to the plane of portion 14. Platform 14 provides a suitable base to the upper side of which the working parts of the telephone set may be attached, and the upright flanges 12 and 13 provide guide means for positioning the base plate with reference to the enclosing telephone substation housing (not shown). A plurality of vent holes 15 are provided in platform portion 14 adjacent one of the end walls 13 not only to provide for adequate ventilation and heat dissipation for the internal components of the telephone set, but also to provide adequate escape means for the sound produced by the ringer mechanism utilized in conjunction with the telephone apparatus.

Near each of the four corners of platform section 14 there is mounted a foot or supporting means 18—21 (only two of which are illustrated in Figure 1) which is fastened to platform section 14 to support the subset above a desk or other surface. Each of the feet 18—21 may be composed of rubber or other resilient material and is usually of circular cross-section and of a thickness sufficient to maintain the platform section 14 above its normally associated supporting surface, such as a desk top, by a convenient distance. While the actual dimensions of the individual feet are not critical, suitable dimensions may be as follows: thickness 5⁄16 inch; diameter, 1 inch.

In accordance with the invention, a passageway 22 is provided through foot 18 to serve as a passage means for a cord containing a plurality of individual leads. In order to illustrate clearly the guiding sidewalls of the passageway 22, the cord has not been shown in Figure 1. However, the cord and its penetration of the base plate 10 is fully illustrated in subsequent figures. Passageway 22 is located in the portion of foot 18 away from the outer edge 12 of base plate 10 and is angled upwardly at a slight angle with respect to the plane of the base plate to provide an oblique angle of entrance for the cord. The side walls of aperture 22 form a channel for supporting the cord and for guiding it at an oblique angle through platform section 14. The diameter of aperture 22 is such that it frictionally supports the cord in its passage through the aperture. The cord (shown in detail in following figures) is of conventional form comprising a cover of rubber or other insulating material surrounding a plurality of leads each separately insulated one from another. An aperture 24 is punched in platform section 14 in registration with aperture 22 of foot 18 to permit the cord to enter through platform section 14.

For a detailed view of the penetration of the cord through platform section 14, reference may now be had to Figure 2 which illustrates the upper side of platform portion 14 as viewed from the interior of the subset. Foot 18 is fastened to the under side of platform 14 by a rivet 17 or other suitable fastening means. Aperture 22 of foot 18 lies below platform portion 14 and is located inwardly of the center of foot 18. Corresponding to and in registration with aperture 22 of foot 18 is an aperture 24 formed in platform 14. Aperture 24 is of sufficient width to permit the entry of a cord 23 and long enough to permit its entrance at a flat or oblique angle so that undue strain on the cord is avoided. Surrounding that portion of cord 23 which extends through aperture 24 is a clip 25 which may be of brass or other suitable material having a small aperture 26 therein to receive a wire 27. Wire 27 is bent at one end to engage clip 25, and is bent at its other end in the form of a loop through which a screw and washer assembly 28 may be inserted and threaded to platform section 14 to relieve any strain on the separate leads of cord 23 as the telephone subset is moved during normal use.

In the embodiment of Figures 1 and 2, a second cord 31 similar to cord 23 may be introduced through an aperture 32 into base 10. An aperture 33 in foot 21 is provided for the purpose of guiding and supporting conductor 31 in its introduction into the base plate in a manner similar to that of aperture 22 of foot 18. Cord 31 may be supported in place by a clip and mounting arrangement (not shown) identical to that described with reference to cord 23, but not herein illustrated.

A further simplification of the present invention may be achieved by eliminating clip 25, support wire 27, and the screw and washer assembly 28. Such an alternative embodiment is shown with respect to cord 31, and either or both cord 23 and cord 31 may be supported without the mechanical screw means illustrated for mounting cord 23. Under these circumstances in order to provide adequate stability to the arrangement and to prevent undue strain upon cord 31 from affecting the connections of its individual leads, cord 31 and its associated foot 21 may be made integral.

Numerous methods and processes for effecting the integral combination of cord 31 and foot 21 will suggest themselves to those skilled in the art. One method of assembly would be to insert cord 31 through aperture 33 of foot 21 and by the application of heat soften the rubber insulating material of cord 31 and the rubber of foot 21. As a result of the application of heat, fusion will take place between the two elements and upon cooling there will result an integral structure in which cord 31 is tightly bound to foot 21. Alternatively, any of a variety well known adhesives may be applied to the outer surface of conductor 31 prior to its insertion into aperture 33, and after hardening of the adhesive, there will result a similar integral structure.

The attachment of foot 21 with its integrally mounted cord 31 to platform portion 14 may follow the fusion or gluing process or alternatively the fusion or gluing process may take place after the mounting of foot 21 by rivet means 17 to platform portion 14.

Alternatively, a suitable molding form comprising a container equal in volume to the desired size of the support member 21 and further having a properly positioned aperture through which cord 31 may be inserted should simplify the integral manufacture of the cord and foot. In this latter case the cord is introduced through the aperture in the form and rubber in a liquified state is poured into the form to flow around the cord therein and fill the container. Upon the hardening of the liquid rubber, an integral structure comprising support member and cord 31 is formed. The integral foot and cord assembly may be removed from the form as a unit and in one simple operation attached to the underside of platform section 14 with the cord introduced through the corresponding aperture in the platform.

For a more detailed view of one embodiment of the present invention, reference may be had to Figure 5 which is an enlarged cross-sectional view taken along line 5—5 of Figure 2 and shows cord 23 as it passes upwardly through aperture 24 above channel 22 of foot 18. Clip 25 is compressed tightly about cord 23 to afford a support means therefor and to relieve strains occurring from pulling forces applied thereto. Wire 27 is shown having one end crimped through aperture 26 and the other end held rigidly between screw and washer assembly 28 and platform portion 14.

As discussed previously foot 18 contains a channel 22, formed therein, for the purpose of introducing cord 23 into aperture 24 of platform portion 14. Foot 18 is mounted below aperture 24 of platform portion 14 so that aperture 22 is in registration therewith to permit passage of cord 23 through both of these apertures. The side walls of channel or aperture 22 form a passageway at an oblique angle to platform portion 14 to provide a passage means for supporting cord 23 and for guiding it at a flat angle through platform section 14. Aperture 22 has a diameter of such dimension that its side walls frictionally engage cord 23 in its passage through the aperture.

For a more detailed showing of the oblique angle with which cord 23 penetrates platform portion 14 and is guided upwardly by passage 22 of foot 18 reference may be had to Figure 6 which is a cross-sectional view of a portion of Figure 2 taken along lines 6—6 thereof. From this view it is readily seen that cord 23 enters aperture 22 of foot 18 in a plane parallel to that of platform portion 14 and is guided upwardly therethrough at a slight oblique angle within the confines of the walls of passage 22. Aperture 24 of platform portion 14 is elongated with respect to the diameter of cord 23 to accommodate it in its entry to the interior of the telephone substation.

An alternative embodiment of the present invention is illustrated in Figure 3. As there shown, one of the cords (cord 23 in the illustrated arrangement), is introduced through the apertures in a manner similar to that discussed with reference to conductor 23 of Figures 1 and 2. The second cord 40 is introduced through a conduit passageway 41, details of which may be found in the aforementioned copending application filed by James M. Robinson, Donald Lewis and Leonard J. Greshel. Generally, however, passageway 41 is formed by a punching operation which results in depressing a semi-conical portion 42 and raising a semi-conical projection 43. The meeting edges of semi-conical projection 43 and depression 42 form a passageway of circular cross-section of sufficient diameter to permit the entrance of conductor 40. The inner surfaces of the semi-conical shaped projection and depression form an oblique angle with respect to planar portion 14 and form an oblique-angled groove to guide cable 40. A clip member 45 surrounds that portion of conductor 40 entering platform portion 14 and has attached thereto a small wire loop 46. Loop 46 at its other end is coiled with one turn through which a screw and washer assembly 47 are threaded into planar platform portion 14 to support cord 40 and relieve its individual conductors from undue strain.

Figure 4 illustrates another embodiment of the present invention in which a single cord is introduced through platform portion 14 at an oblique angle through aperture 22. In order to produce this embodiment, it is simply necessary to enlarge aperture 22 of foot 18 sufficiently to accommodate cord 50 which may be of slightly larger diameter than conductor 23 in that it contains all the separately insulated conductors previously split between two cords. It may also be necessary to enlarge the aperture 22 of foot 18 in order to provide for the facile passage of conductor 50.

In summary, the invention comprises a base plate through which a conductor carrying cord is introduced at an oblique angle, which angle is determined by an aperture through one of the feet which serves to support the base plate above a desk or other telephone supporting means. Alternative embodiments characterized by the introduction of one or more conductor carrying cords through the base plate may be employed. It is evident that the present invention results in a telephone subset which is more attractive in appearance than commercially available models and in which there is a considerable reduction in cost. The invention is simple to manufacture and economical in production.

Although the novel base plate and apertured supporting member have been illustrated with reference to a telephone substation set, it is apparent that its utility is not so circumscribed and that it may be used to great advantage in other environments wherein it is necessary to introduce a conductor-carrying cord into the interior of a cabinet enclosing electrical apparatus. Such environments may include radio receivers, television receivers, voice recording apparatus, electrical typewriters and the like; and the claims are intended to include such structures.

While what is described is regarded to be a preferred embodiment of the invention, it will be apparent that variations, rearrangements, modifications and changes may be made therein without departing from the scope of the present invention as defined by the appendant claims.

I claim:

1. A telephone substation set comprising a base member, a conductor-carrying cord, an aperture in said base member, and at least one foot member having an oblique passageway with respect to said base member attached to said base member with the passageway of said foot member and the aperture of said base member in registration to form a passageway for the introduction of said conductor-carrying cord into the interior of said telephone substation set at an angle oblique to said base member.

2. A telephone substation set as set forth in claim 1 which includes cord engaging means mounted in fixed relation with said base member to provide strain relief for said cord.

3. A telephone substation set comprising a base member, a conductor-carrying cord, an aperture in said base member, and at least one support member having an oblique passageway therein attached to said base member with the passageway of said support member in registration with the aperture of said base member to form an oblique passageway with respect to the plane of the base member for the introduction of said conductor-carrying cord into said aperture, said passageway being dimensioned relative to said cord to frictionally engage same in its passage therethrough.

4. A telephone substation set as set forth in the previous claim 3 in which said cord and said support member are integrally fashioned to form a composite unit.

5. A telephone substation set comprising a base member having a pair of apertures disposed in spaced apart relationship, at least a pair of apertured support means attached to said base member, each support means respectively positioned adjacent a corresponding aperture in said base member and so disposed that its aperture is in registration with the corresponding one of said apertures in said base member, the walls of each of said apertures in said support means being adapted to form an oblique groove with respect to the plane of said base member to define a passageway for the introduction of a conductor-carrying cord into said telephone substation set.

6. A telephone substation set comprising a base member having at least a pair of apertures disposed in spaced apart relation, a first and a second conductor-carrying set, and at least one support member having an oblique passageway with respect to said base member attached to said base member with said passageway in registration with one of said apertures in said base member to form a passageway for the introduction of one of said conductor carrying cord sets into the interior of said telephone substation set, the other of said apertures in said base member comprising a pair of semi-conical wall sections offset in opposite directions from the plane of the base member which terminate at their base ends in a common plane to define a substantially circular opening therebetween to permit the introduction of the second conductor-carrying set therethrough in an oblique manner relative to said base member.

References Cited in the file of this patent

UNITED STATES PATENTS

| | | |
|---|---|---|
| 2,548,723 | Houdek | Apr. 10, 1951 |
| 2,573,600 | Pruehs | Oct. 30, 1951 |

FOREIGN PATENTS

| | | |
|---|---|---|
| 951,898 | France | Nov. 4, 1949 |